April 7, 1936.   M. H. GRAHAM   2,036,210
TOASTER
Filed March 30, 1932   5 Sheets-Sheet 1

INVENTOR
MAURICE H. GRAHAM
ATTORNEYS

April 7, 1936.  M. H. GRAHAM  2,036,210
TOASTER
Filed March 30, 1932   5 Sheets-Sheet 3

INVENTOR
MAURICE H. GRAHAM.
By Paul, Paul Moore
ATTORNEYS

April 7, 1936.    M. H. GRAHAM    2,036,210
TOASTER
Filed March 30, 1932    5 Sheets-Sheet 4

INVENTOR
MAURICE H. GRAHAM.
By
ATTORNEYS

April 7, 1936.  M. H. GRAHAM  2,036,210
TOASTER
Filed March 30, 1932   5 Sheets-Sheet 5

INVENTOR
MAURICE H. GRAHAM.
By
ATTORNEYS

Patented Apr. 7, 1936

2,036,210

UNITED STATES PATENT OFFICE 2,036,210

TOASTER

Maurice H. Graham, St. Louis Park, Minn.

Application March 30, 1932, Serial No. 601,991

9 Claims. (Cl. 53—5)

This invention relates to toasters, and more particularly to automatic toasters provided with thermally responsive control means adapted to be inserted into a bread slice to be toasted. A toaster embodying such control means which are receivable within the bread slices is disclosed in my co-pending application Serial No. 567,427, filed October 7, 1931.

The operation of toasters of this general type is based upon the theory that the temperatures of the insides of bread slices toasted to a uniform degree in any given toaster are substantially equal when such degree of toasting is reached, irrespective of variations of initial oven temperatures. That is to say, the theory is that a slice of bread placed in an oven having one initial temperature and maintained in such oven until toasted to a predetermined degree, will have at the instant of reaching such predetermined degree an inside temperature substantially equal to that of another slice of bread which has reached such a degree of toasting after having been placed in the oven while at a different initial temperature. When bread slices of uniform thickness are dealt with, the inside temperature at the instant of reaching a predetermined degree of toasting will be substantially constant, irrespective of initial oven temperature. However, there will be some variation of the inner temperature in cases where the thickness of the slices varies. A relatively thick slice of bread will have an inside temperature when toasted to a predetermined degree, which is lower than the inside temperature of a thinner slice at the instant of being toasted to the same degree. I have found that if the thermally responsive control means are inserted into the bread slices to depths varying with the thicknesses thereof, the toaster will operate to produce uniform toast irrespective of the thicknesses of the bread slices which are inserted therein.

It is therefore one of the general objects of the present invention to provide means in a toaster of the type referred to, for inserting the control means into bread slices to depths varying with their thicknesses.

In accordance with this invention, the thermally responsive control means of the toaster are inserted into the thinner slices to a greater depth than they are inserted into the relatively thicker slices. In the case of the thicker bread slices, a greater part of the thermally responsive control means will accordingly be directly exposed to the oven heat and the additional heat thus received will serve to compensate for the relatively low temperature prevailing inside of the bread slice at the completion of the toasting operation.

It is a further object of the invention to provide means for holding the bread carrying means in locked position against movement into toasting position, when there is no bread slice positioned thereon. More particularly, it is an object to provide a simplified locking means which is associated with the above mentioned means for regulating the depth of penetration of the control means.

These and various objects of the invention will become more readily apparent upon a detailed study of the accompanying drawings and specification together with the appended claims.

Referring to the drawings, which illustrate merely one form of toaster embodying the invention, Figure 1 is a longitudinal cross section through the toaster;

Figure 1:
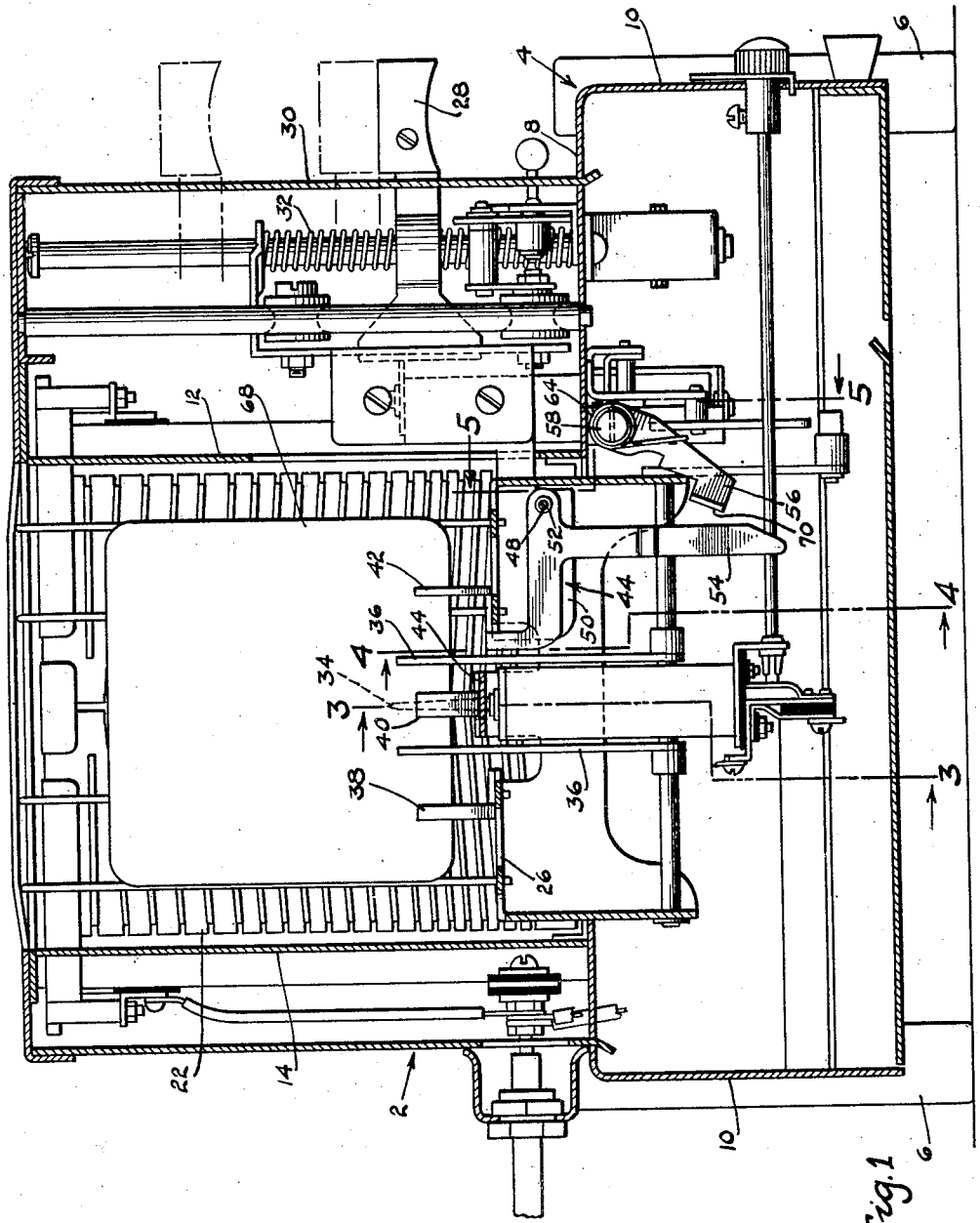
Figure 2:
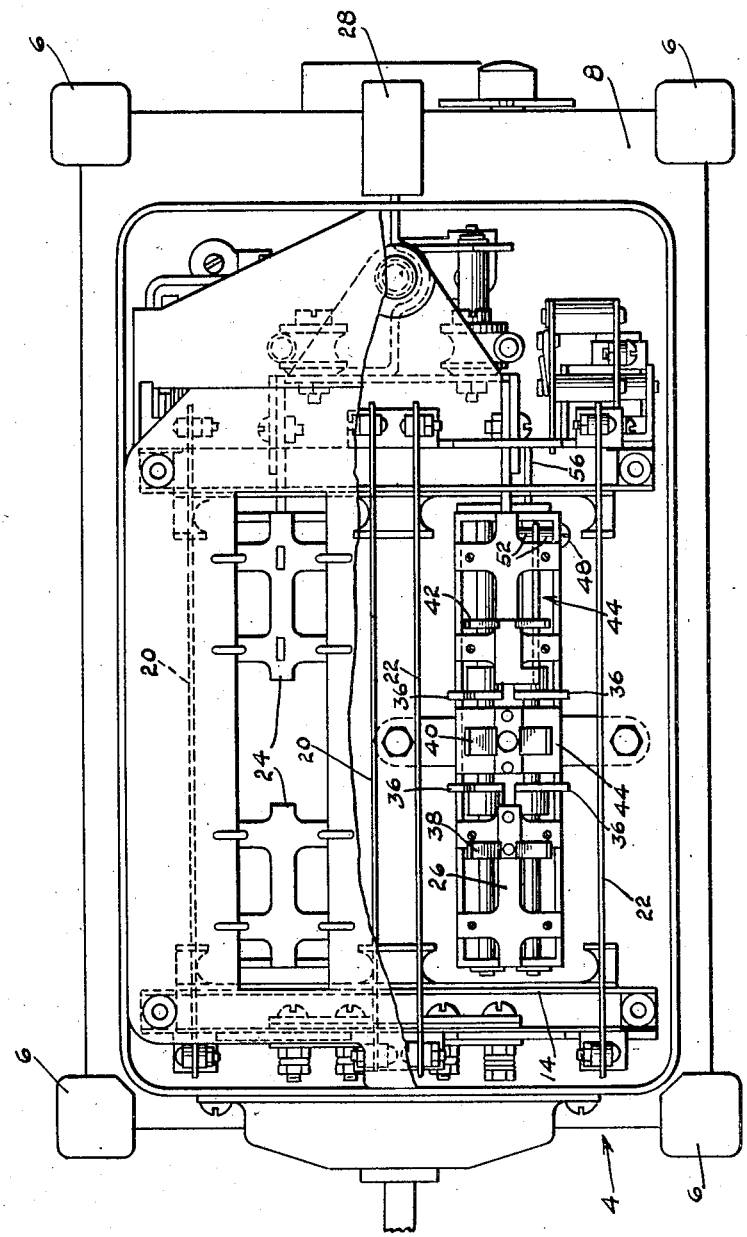
Figure 2 is a top plan view thereof.

Referring to the drawings more particularly, numeral 2 designates generally an automatic toaster having a lower supporting casing 4 which is fixed to and supported by suitable legs 6. The casing 4 is made of sheet metal or the like and comprises a top portion 8 having sides 10 bent downwardly at right angles therefrom. The top 8 of the casing has mounted thereon an oven casing formed of a front wall 12, a rear wall 14, and side walls 16 and 18, all of sheet metal. Within this oven casing there are arranged a plurality of conventional heating elements 20 and 22. The elements 20 form an oven or toasting chamber together with the front and rear walls 12 and 14, and the heating elements 22 form a similar oven with the walls 12 and 14. Bread carriers 24 and 26, which are actuated by means of a handle 28 extending outside of the main casing 30 of the toaster, are adapted to move up and down within the ovens defined by the heating elements, in order to convey bread slices to and from toasting position with reference to the heating elements. That is to say the bread carriers are movable between an uppermost position of ejection, in which position toasted bread slices are removed therefrom and bread slices to be toasted are supplied thereto, and a lowermost toasting position, in which position the carriers are locked during the toasting operation. The bread carriers are held in toasting position against the action of spring 32 by means of a suitable latch mechanism and upon release of this latch mechanism the bread carriers are moved into the position of ejection by means of the spring 32.
In order to control the toasting operation there is provided a pointed, thermostat housing 34 in which there extends longitudinally a compensated thermobar (not shown). Any suitable means are associated with this thermobar for automatically releasing the latch mechanism holding the bread carriers in toasting position, thereby to control the toasting operation. The thermostat housing 34 is mounted in fixed position with respect to the supporting casing 8 and extends upwardly through an opening in bread carrier 26 when the latter is in toasting position, and into the oven formed by the heating elements 22. It is so positioned as to become embedded in bread slices upon the bread carrier 26 as shown in Figure 3.
In order to assure that the housing 34 will pierce the bread slices, suitable jaws 36 are provided for holding the bread slices in fixed position with respect to the carrier during movement of the latter from position of ejection to toasting position.
The various details concerning the electrical energizing and control circuits of the toaster, the latching means for holding the bread carries in toasting position, and various other general features of construction have not been described in detail inasmuch as they form no part of the present invention and are of the same character as those fully described in my co-pending application above referred to.

In the present toaster, the carrier 26 is provided at its top with a plurality of upstanding V-shaped supports or guides 38, 40 and 42 upon which bread slices placed on the carrier rest. The support 40 is centrally located with respect to supports 38 and 42 as will be evident from Figure 1, and is fixed to the central raised portion 43 of the top of the bread carrier, through which the housing 34 extends. The V-shaped support 38 is also fixed to the top of bread carrier 26 at one side of the support 40 and symmetrically with respect to the longitudinal center line of the bread carrier. The V-shaped support 42 is oppositely positioned with respect to the support 40 and is also symmetrical with respect to the longitudinal center line, but is not fixed to the bread carrier 26. Support 42 is formed integrally with a catch control member, generally designated at 44 and pivoted to the carrier 26 by means of a bolt 48 secured to one of the downwardly depending sides of the bread carrier, and a handle member 50 which is fixed to the underside of the bread carrier and forms a part of the means for raising and lowering the same. Suitable spacers 52 are provided for preventing transverse movement on the part of the catch control member 44 which is provided with a downwardly extending extension 54 for a purpose to be later described.

Figure 6:
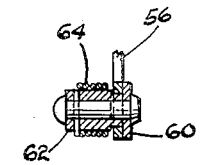
Figure 6 is a cross section along the line 6—6 of Figure 5.

A catch member 56 is pivotally mounted upon a pin 58 mounted in a bracket 60 which is secured to the underside of the supporting casing 4. The pin 58 carries a sleeve 62 which has a reduced portion about which the catch member fits and a spring 64 is wound therearound. One end of the spring 64 is passed through an opening in the pin 58 so as to be fixed with respect thereto as illustreated in Figure 6 and the other end of the spring engages the catch member 56 to normally urge the same in the path of the bread carrier 26 as will be evident from Figures 7 and 8.

Figure 3:
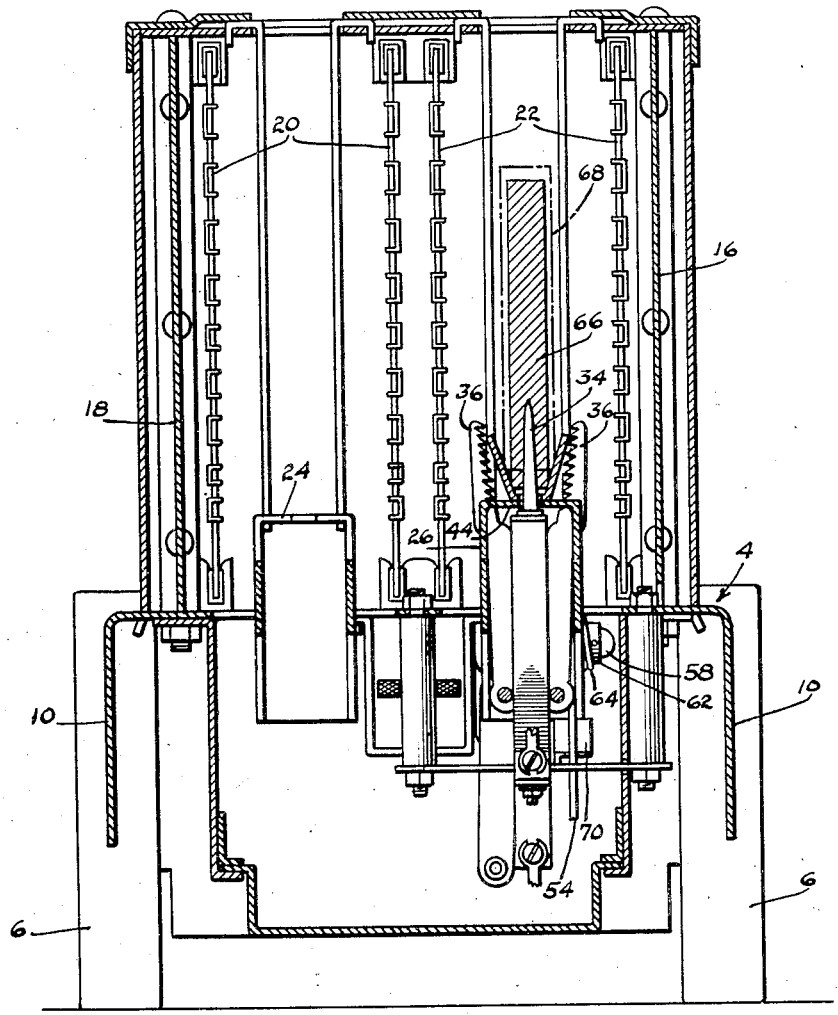
Figure 3 is a cross section along line 3—3 of Figure 1.
Figure 4:
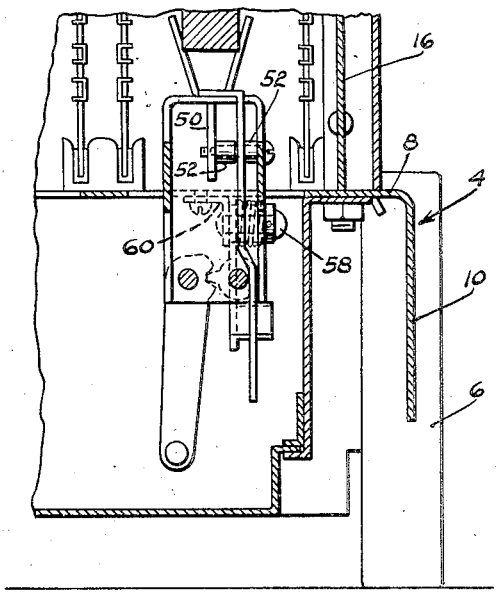
Figure 4 is a cross section along the line 4—4 of Figure 1.
Figure 5:
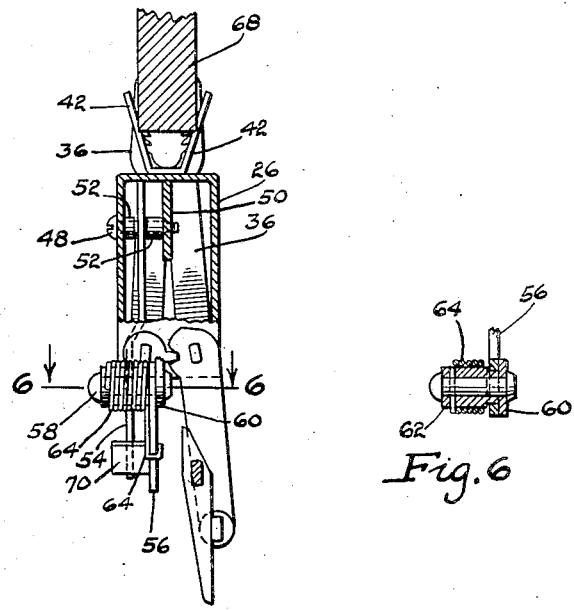
Figure 5 is a cross section along the line 5—5 of Figure 1.

By reference to Figure 3 it will be observed that the V shaped supports or guides on top of the bread carrier 26 receive the bread slices and serve to position them in various positions with respect to carrier 26, depending upon the thicknesses thereof. The relatively thin slice of bread 66 which is shown in cross section in Figure 3 occupies a position nearer the top of bread carrier 26 than bread slice 68, shown in dot and dash lines, and which is materially thicker than bread slice 66. Since the housing 34 of the thermal control means and the bread carrier 26 are always in the same relative positions when bread carrier 26 is in toasting position, i. e. in the position shown in Figure 3, the housing 34 will become embedded in a bread slice mounted on carrier 26 to a depth depending upon the relative positions of the bread slice and the bread carrier. Inasmuch as the positions of the bread slices mounted on the carrier, with respect to the carrier itself, are automatically determined by the thicknesses of the bread slices due to the provision of the upstanding V shaped supports or guides, it will be apparent that the depth of insertion of the housing 34 into any given bread slice placed upon the carrier 26 will vary with the thickness thereof. As shown in Figure 3 the depth of insertion in the case of a thicker slice will be less than in the case of a thinner slice and it may therefore be said that the housing is inserted into bread slices to be toasted, to depths varying inversely with their thicknesses.

In the case of a thick bread slice, there will be a greater portion of the housing 34 directly exposed to the heat of the oven than is exposed in the case of a thinner slice, where the depth of penetration into the bread slice is greater. Because of this greater direct exposure of housing 34 to oven heat, the thermostat within the housing will of course reach a given temperature more quickly than it would have reached such temperature had the entire housing been embedded in the thick bread slice and shielded thereby. Since the control of the toaster depends upon the temperature of the thermostat within housing 34 it will be seen that the thick bread slice will be retained within the oven for a shorter time than the same slice would have been retained in the event the thermal housing had been completely embedded therein. When a thinner slice is to be toasted, a smaller portion of housing 34 is directly exposed to oven heat. However, if equal initial oven temperatures be assumed, the time during which a thick slice having the thermostat only partially inserted is retained in the oven, is substantially the same as the time during which a relatively thinner slice with more fully inserted thermostat is retained in the oven. This probably follows because of the fact that in one case the controlling thermostat receives more heat directly from the oven and less from the bread, whereas in the other case it receives more heat from the bread and less directly from the oven.

Figure 7:
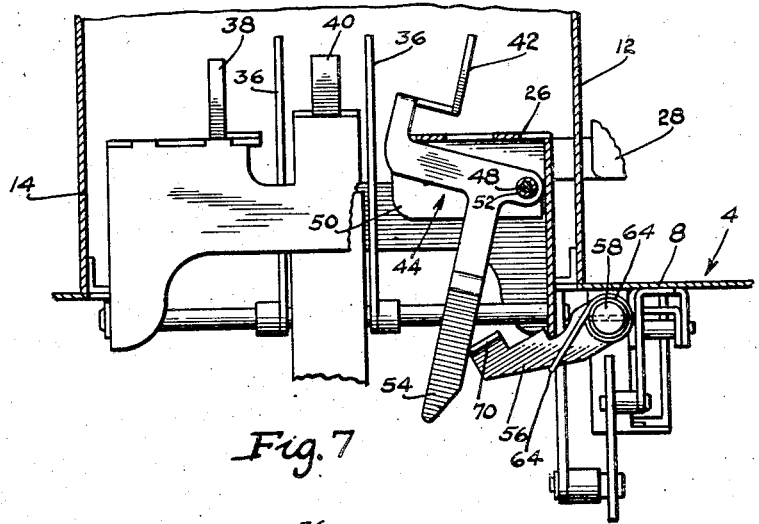
Figure 7 is a detached view partly in cross section, showing the bread carrier held in locked position when there is no bread slice thereon.
Figure 8:
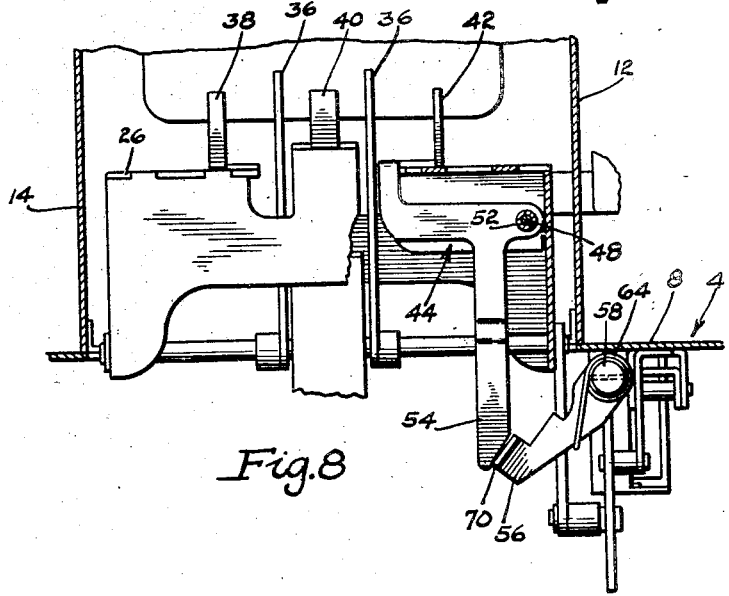
Figure 8 is a view similar to Figure 7 showing the position of the parts when a bread slice is positioned upon the carrier.

The operation of the means for locking the bread carriers will now be described. Assuming that an attempt is made to depress the operating handle 28 when there is no bread slice placed in position upon the carrier 26, the extension 54 of the catch control member 44 will engage the cam surface 70 of the catch member 56 upon downward movement of the bread carrier. However, the catch control member 44 will be free to pivot or rotate into position as shown in Figure 7 and the extension 54 will slide off of the cam surface 70 without moving the catch member 56 out of the path of travel of the bread carrier. The parts assume the positions shown in Figure 7, and the carrier 26 will be locked against further downward movement into toasting position. Thus, it will be impossible to either close the energizing circuit for the toasting elements or latch the bread carriers in toasting position within the oven when there is no bread slice or carrier 26.

When the parts assume the relative position as illustrated in Figure 7, the operating handle 28 occupies the lowermost dotted line position shown in Figure 1 and when the carriers are latched in toasting position the handle of course occupies the full line position shown in Figure 1. The uppermost dotted line position is the position of the handle when the bread carrier is in position of ejection.

When a slice of bread is placed upon the carrier 26 before the operating handle is depressed, however, the bread slice which rests upon the V shaped supports, including support 42 formed integrally with catch control member 44, will prevent rotation of the catch control member into the position shown in Figure 7. Consequently, the lower extension 54 will retain the position shown in Figure 8 and engage the cam surface 70 of the catch member 56 to move the same out of the zone of travel of the bread carrier 26 so that the carrier may be moved all the way down into toasting position and held in such position by the catch mechanism in the usual way. Even though the weight of the bread itself might not be sufficient to prevent rotation of the catch control member 44 into the position illustrated in Figure 7, such rotation is prevented because of the fact that the bread gripping jaws 36 hold the bread in fixed position with respect to the carrier during downward movement thereof, that is during the period of engagement of the lower extension 54 with the cam surface 70 of the catch 56. Of course, the spring 64 is of such strength that an ordinary bread slice will be able to hold the catch control member 44 against rotation, when held by the bread gripping jaws.

The above described locking means are important in the type of toaster shown since it prevents exposure of the completely bare thermostatic housing 34 to the heat of the elements 22. This feature is of particular importance in a double slice toaster having only one control as shown since it is impossible for an operator to insert a bread slice only on carrier 24 and completely compress the operating handle. If it were possible to latch the carriers in toasting position without having a bread slice upon carrier 26, an operator might place a bread slice only on carrier 24 in which case the automatic control means would release the latch mechanism for the carriers prematurely and automatic toasting would not result.

Having now described my invention, what I claim as new and desire to secure by Letters Patent of the United States is as follows:

1. In an automatic toaster having heating means, a carrier movable between a toasting position and a position of ejection to carry bread slices to and away from toasting position with respect to said heating means, and means receivable in a bread slice to be toasted for controlling the toasting thereof, said carrier and control means being adapted to occupy fixed relative positions when the carrier is in toasting position, means for supporting bread slices to be toasted in various positions relative to the carrier depending upon the thicknesses thereof, whereby the control means are inserted into the bread slices to varying depths depending upon their thicknesses, and lock means associated with said supporting means for retaining the bread carrier locked, and a lock-means releasing device subject to the action of a bread slice positioned on said bread-supporting means and operative to render said lock means inoperative on said supporting means.

2. In an automatic toaster having heating means, a bread carrier movable between a toasting position and a position of ejection to carry bread to and away from said heating means, and means receivable within a bread slice on the carrier for controlling the toasting thereof, said carrier and control means occupying fixed relative positions when the carrier is in toasting position, means for supporting the bread slices to be toasted in various positions relative to the carrier depending upon the thicknesses thereof, whereby said control means are inserted into the bread slices to various depths depending upon their thicknesses.

3. In an automatic toaster having heating means, a bread carrier movable between a toasting position and a position of ejection to carry bread to and from positon to be toasted by said heating means, and means receivable in a bread slice on the carrier when the latter is in toasting position for controlling the toasting of the bread slice, said control means and carrier being adapted to occupy fixed relative positions when the carrier is in toasting position, a V-shaped member forming a support for bread slices on the carrier and adapted to retain such slices in varying positions with respect to the carrier depending upon the thicknesses thereof, whereby each slice on the carrier will be pierced by the control means to a depth depending upon the thickness thereof.

4. In a toaster having heating means, and manually operable means for carrying bread slices into and out of position to be toasted by said heating means, means adapted to be rendered inoperative by a bread slice upon the carrying means for locking the carrying means against movement toward toasting position.

5. In an automatic toaster having heating means, and reciprocating means for carrying bread slices to and from toasting position, catch means rendered inoperative by the weight of a bread slice for locking the carrying means against movement toward toasting position.

6. In an automatic bread toaster having a support, heating means on the support, and means for moving bread slices to and away from toasting position with respect to said heating means, a catch pivoted with respect to the support and normally in position to be engaged by the bread moving means thereby to lock the same against movement into toasting position, and means associated with the bread moving means for rendering said catch inoperative when a bread slice is positioned thereon.

7. An automatic toaster comprising a support, heating means mounted thereon, a bread carrier movable between a discharge position and a toasting position with respect to said heating means, thermally responsive control means receivable in a bread slice on the carrier when in toasting position for controlling the toasting thereof, said carrier and control means occupying fixed relative positions when the carrier is in toasting position, a plurality of V-shaped supports adapted to support bread slices on the carrier in various positions relative thereto depending upon the thicknesses of said slices, whereby said control means are inserted into each bread slice to a depth depending upon its thickness, a catch member pivotally mounted with respect to the toaster's support, a spring for normally urging said catch member into position to be engaged by the carrier during movement of the latter toward toasting position thereby to lock the same, and a catch control member pivoted on the bread carrier and formed at one end into one of the aforementioned V-shaped supports, said catch control member occupying a position to render the said catch member inoperative when a bread slice is upon the carrier and occupying a second position in which it is incapable of rendering said catch member inoperative when there is no bread slice mounted upon the carrier.

8. In an automatic toaster having a bread heating means and a support for the bread slice to be toasted, said heating means including an element insertable into the bread slice to varying distances, and a variably-acting bread slice engaging stop associated with said bread support and operative to vary the insertion of said insertable element into the bread slice inversely proportionate to the thickness of said slice.

9. In an automatic toaster having a bread heating means and a support for the bread slice to be toasted, said heating means including an element insertable into the bread slice to varying distances, and a diverging bread slice engaging stop associated with said bread support and diverging toward the point of said insertable element and operative to vary the insertion of said insertable element into the bread slice inversely proportionate to the thickness of said slice.

MAURICE H. GRAHAM.